July 5, 1949.  F. J. WOOD  2,475,070
POULTRY FEEDER
Filed Feb. 25, 1946  2 Sheets-Sheet 2
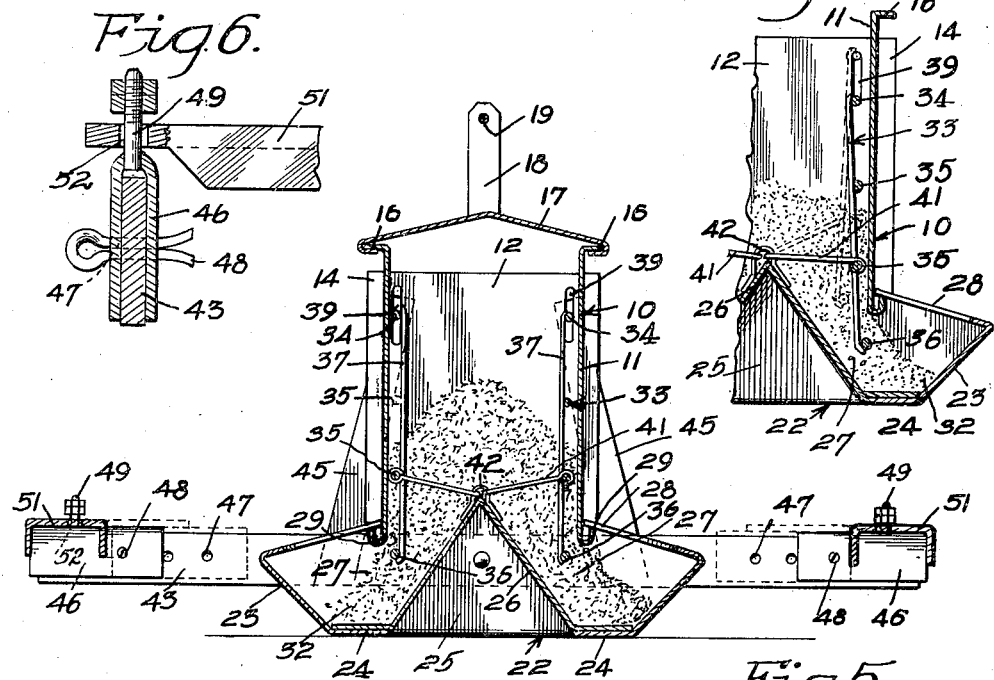
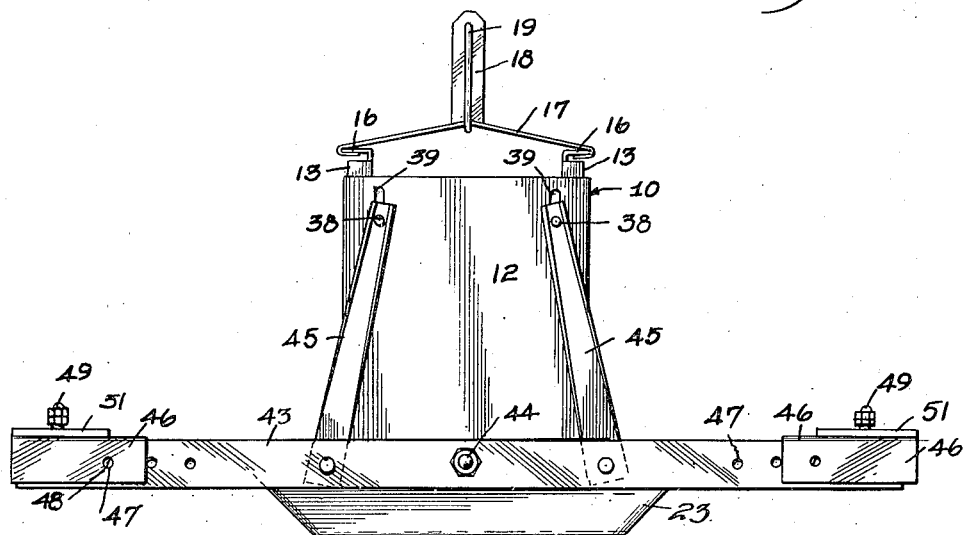
Inventor
Franz J. Wood
by Alfred G. Hague atty Patented July 5, 1949

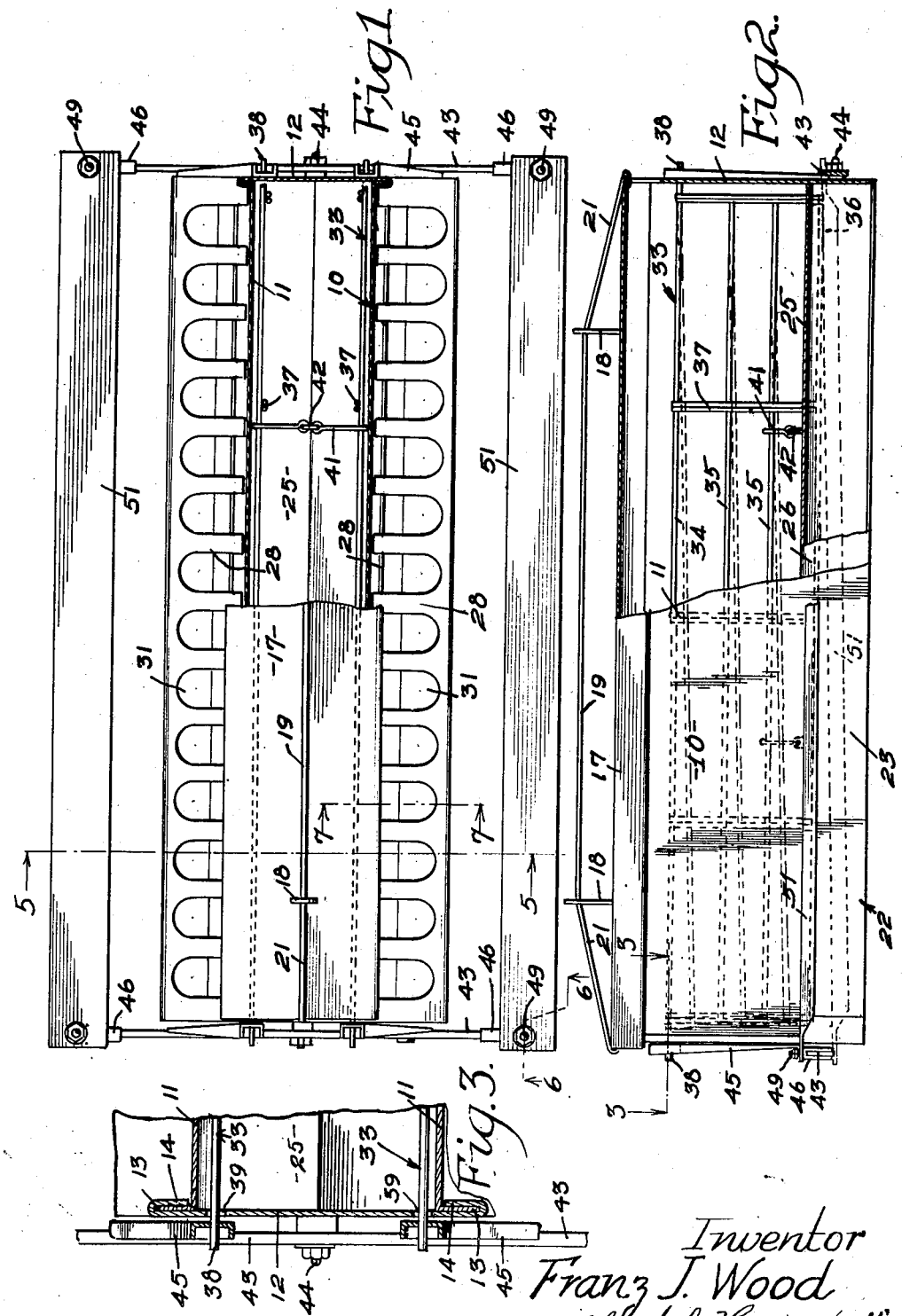

2,475,070

UNITED STATES PATENT OFFICE 2,475,070

POULTRY FEEDER

Franz J. Wood, Des Moines, Iowa

Application February 25, 1946, Serial No. 649,981

9 Claims. (Cl. 119—55)

This invention relates to an improved feeder for feeding dry mash to young poultry of the type employing an elongated and comparatively narrow hopper adapted to deliver feed to a trough located adjacent to the lower and delivery side of the hopper, in which is supported an agitator for loosening the feed therein, designed to be automatically actuated by a movable perch operated by the weight of the fowl as it stands in feeding position.

It is the object of my invention to provide a simple, durable and comparatively cheap device for automatically and economically feeding dry mash to young poultry.

A further object of my invention is to provide in a device for feeding dry mash to young poultry, including a hopper and feeding troughs, improved means for agitating the feed within the hopper to more positively deliver the feed to the trough in such a manner that it may be consumed by the fowl without waste.

A further object of my invention is to provide in a poultry feeder of the type having a supply hopper, a feed trough and an agitator to assist the flow of feed from the hopper to the feed trough, improved means which may be easily operated by the weight of small fowl perched in position for feeding from the trough.

A further object of my invention is to provide in a poultry feeder of the type having a hopper and a feeding trough, an improved cover for the hopper.

My invention consists in the construction, arrangement and combination of the various parts of the device, whereby the objects contemplated are attained, as hereinafter more fully set forth, pointed out in my claims, and illustrated in the accompanying drawings, in which:

Figure 1 is a plan view of my improved poultry feeder, a portion of the top being broken away.

Figure 2 is a side elevation of the same, a portion of one side being broken away.

Figure 3 is an enlarged detail sectional view taken on the line 3—3 of Figure 2.

Figure 4 is an end elevation of my improved feeder.

Figure 5 is a transverse sectional view taken on the line 5—5 of Figure 1.

Figure 6 is an enlarged detail sectional view taken on the line 6—6 of Figure 1, and Figure 7 is a detail sectional view taken on the line 7—7 of Figure 1.

Referring to the accompanying drawings, I have used the reference numeral 10 to indicate the hopper of my improved poultry feeder comprising, side members 11 and end members 12; the top and bottom of the hopper being open, each end of each side member is provided with a lateral flange 13 (see Fig. 3); the end members 12 are secured to the sides by bending the portions 14 around and against the flanges 13, in a manner clearly illustrated, the upper ends of the ends 12 terminating a slight distance below the upper end of the sides 11. The upper edges of the sides 11 are provided with outwardly extending flanges 16. The flanges 16 are designed to support a cover 17, said cover having its side edges bent around and under the edges of the flanges 16 to form guides, and also to provide supports by means of which the hopper may be carried in a manner hereinafter made clear.

The cover is formed with oppositely inclined surfaces as clearly illustrated. The top of the cover is provided with upright supports 18, designed to support a wire or rod 19 which serves as a handle for carrying the feeder and also to provide means for discouraging the fowls from roosting on the cover. The ends of the rod 19 are bent downwardly and folded under the ends of the cover 17 as illustrated.

The upper ends of the flanges 13 are cut away to permit the under-turned edges of the cover to slide longitudinally past the said flanges, whereby the cover may be removed from the hopper if so desired.

A trough section 22 is supported beneath the hopper 10. Said section consists of inclined sides 23 and bottom portions 24, a central portion 25 having inclined sides 26 projecting upwardly into the longitudinal center of the bottom side of the hopper to divide the section to provide a separate trough beneath each side member 11, as clearly shown in Figure 5. The lower edge of each side 11 terminates above the portions 24 a considerable distance to provide a feed space 27. The upper edge of each member 23 is bent inwardly and upwardly to form guard plates 28 with their free ends resting on members 29 formed on the lower sides of the members 11.

Each of the guard plates 28 is provided with openings 31 through which the fowl may feed. The guards serve to prevent them from standing in the troughs while feeding. By the above described construction it will be seen that feed placed in the hopper 10 will be divided by the member 25 and feed separately to each of the troughs through the spaces 27, in a manner shown in Figure 5 with a thin layer of feed 32 on each bottom member 24.

I find, however, that there is a tendency for the material such as mash to clog in the space 27. To overcome this difficulty I have provided an agitator rack 33, said rack comprising horizontal rods 34, 35, 36, and vertical rods 37, the rack being supported near the inner face of each side member 11 with the lower rod 36 supported in the space 27. The rods 34 have end portions 38 extending through slots 39 in the end members 12. The lower rods 35 are each provided with links 41, pivotally connected to staples 42 supported by the top of the member 25 with the links normally in an upwardly and outwardly inclined position as shown in Figure 5.

For actuating the agitator, I have provided the following mechanism. Pivotally secured to each end of the hopper 10 by means of a bolt 44 is a rock bar 43. Links 45 provide means for operatively connecting each of the rock bars with their respective rod portions 38. On the end of each of the rock bars is mounted a carriage 46. Each carriage is preferably a strap iron in the form of an inverted U having an opening 47 and a pin 48 adapted to enter any one of a number of openings in the bars 43, thus providing means whereby the carriage may be adjusted on the bars 43. Fixed in the top edge of each carriage is a bolt 49. Supported on each corresponding set of carriages 46 is a perch 51 secured in position by the bolts 49 loosely supported in holes 52 in the ends of said perches 51, to provide a limited pivotal connection between the carriages and the perches. The perches are located near and parallel with the feed troughs for supporting the poultry while feeding from the troughs. The weight of the fowls moves the perches downward, which in turn rocks the bars 43 causing one set of links 45 to be lowered, and the other set of links 45 to be elevated, thereby actuating the agitator racks 33 to loosen any mash in the hopper to prevent packing of the same.

As the agitator rack is moved downward, the lower rod 36 also moves downward, causing a portion of the mash in the space 27 to be moved into the feed trough. It will also be seen that downward movement of the rack 33 will swing the outer ends of the links 41 downwardly and outwardly causing the rod 36 to also be moved downwardly and outwardly, as shown in the solid lines, Figure 7. The dotted lines show the rack at its upper position of movement.

By mounting the rack 33 near the side wall 11 it may be actuated more easily than it could be if it were mounted in the center of the stack of mash, making it possible for small poultry to actuate the racks by their weight when feeding. By making a loose or pivoted connection between the carriages and the perches, one end of a perch may be lowered without lowering the other end which in turn will cause the corresponding end of the rack 33 to be lowered as shown in dotted lines, Figure 2. By this arrangement the force necessary to operate the rack is greatly reduced, making the feeder more readily adapted for the feeding of young poultry of light weight.

Thus it will be seen that I have provided an improved poultry feeder of simple and cheap construction, having an improved agitator, and means for operating the same, so constructed and arranged that it can be operated by very young poultry and at the same time provide for positive feeding of the mash to the feed troughs. One or more small fowl on one end of a perch will cause the corresponding end of the agitator rack to be actuated without operating the other end of said rack, and thus prevent movement of feed into that portion of the trough from which it is not consumed. The adjustment of the carriages provides for the movement of the perches toward or from the corresponding trough. The feeder is thus adjustable for use in the feeding of fowl of various ages and size.

I claim:

1. A poultry feeder comprising, a feed trough, a hopper for delivering feed to said trough, an agitator mounted horizontally within said hopper to reciprocate vertically therein, a perch near one side of said trough, means yieldably supporting each end of said perch to permit one of its ends to move vertically and independently of the other, and means operatively connecting each end of said perch to a corresponding end of said agitator rack.

2. A poultry feeder comprising, a feeding trough, an upright and elongated hopper, the lower edge of one side of said hopper terminating in said trough, an upright agitator rack adjacent to the inner face of said side, mounted to reciprocate vertically therein, a horizontally arranged rock bar pivotally connected to each end of said feeder, a perch having each end pivotally connected to a corresponding end of said rock bar, spaced from and substantially parallel with said trough, and means operatively connecting a movable portion of each of said rock bars with a corresponding end of said agitator, whereby the movable end of one of said rock arms and the corresponding end of said agitator may be operated independently of the other end of said agitator rack and its corresponding rock arm.

3. A poultry feeder comprising, a feed trough, a hopper for delivering feed to said trough, an agitator mounted horizontally within said hopper to reciprocate vertically therein, a perch near one side of said trough, means yieldably supporting each end of said perch to permit one its ends to move vertically and independently of the other, means operatively connecting each end of said perch to a corresponding end of said agitator rack, and means for guiding the lower side of the agitator to swing outwardly as it moves downwardly.

4. A poultry feeder comprising, a feeding trough, an upright and elongated hopper, the lower edge of one side of said hopper terminating in said trough, and above its bottom to provide a feed space, an upright agitator rack adjacent to the inner face of said side having its lower edge terminating in said feed space, a perch near one side of said trough, means yieldably supporting each end of said perch to permit one of its ends to move vertically and independently of the other, and means operatively connecting each end of said perch to a corresponding end of said agitator rack.

5. A poultry feeder comprising, a feeding trough, an upright and elongated hopper, the lower edge of one side of said hopper terminating in said trough, and above its bottom to provide a feed space, an upright agitator rack adjacent to the inner face of said side having its lower edge terminating in said feed space, a horizontally arranged rock bar pivotally connected to each end of said feeder, a perch having each end pivotally connected to a corresponding end of said rock bar, spaced from and substantially parallel with said trough, and means operatively connecting a movable portion of each of said rock bars with a corresponding end of said agitator, whereby the movable end of one of said rock arms and the corresponding end of said agitator may be operated independently of the other end of said agitator rack and its corresponding rock arm.

6. A poultry feeder comprising, in combination, an elongated hopper having end members provided with vertical slots near their side edges, troughs for receiving feed from said hopper, a rock bar having its central portion pivoted to each end of said hopper, a perch having each end pivotally connected to a corresponding end of said rock bars and adjacent to said troughs, an agitator rack near the inner face of each side member of said hopper, the lower edge of said agitator rack terminating in a corresponding trough, portions of the upper edge of the agitator extending through corresponding slots in said end members, links operatively connecting the projecting end portions of the agitator with corresponding end portions of said rock bars.

7. A poultry feeder comprising, in combination, a hopper, a pair of troughs communicating with the bottom of said hopper and a pair of agitators within said hopper mounted to be actuated therein, means for actuating said agitator, comprising a rock bar having its central portion pivoted to each end of said hopper, a carriage adjustably and slidably mounted on each end of said rock bar, a perch adjacent to each trough and supported by a set of corresponding ends of said rock bars, means pivotally connecting each end of each of said perches to a corresponding carriage, and means operatively connecting a movable portion of each rock bar to a corresponding end of a corresponding agitator rack.

8. A poultry feeder comprising, in combination, a hopper, a trough communicating with the bottom of said hopper and an agitator within said hopper mounted to be actuated therein, means for actuating said agitator, comprising a rock bar pivotally connected to each end of said hopper, a carriage adjustably and slidably mounted on the free end of each rock bar, a perch adjacent to said trough and supported by the ends of said rock bars, means pivotally connecting each end of said perch to a corresponding carriage, and means operatively connecting each rock bar to a corresponding end of said agitator.

9. A poultry feeder comprising, a feed trough, a hopper, having vertical side members, for delivering feed to said trough, an agitator mounted adjacent to each inner face of said side members to reciprocate vertically within said hopper, a perch near one side of said trough, means yieldably supporting each end of said perch to permit one of its ends to move vertically and independently of the other, and means operatively connecting each end of said perch to a corresponding end of said agitator rack.

FRANZ J. WOOD.

REFERENCES CITED

The following references are of record in the file of this patent:

UNITED STATES PATENTS

| Number | Name | Date |
| --- | --- | --- |
| 1,357,755 | Wilch | Nov. 2, 1920 |
| 1,480,497 | Brandt | Jan. 8, 1924 |
| 1,615,402 | Pratt | Jan. 25, 1927 |
| 2,357,698 | Stafford | Sept. 5, 1944 |